United States Patent [19]

Baldwin

[11] 4,404,238

[45] Sep. 13, 1983

[54] PRECIPITATED ALUMINA FOR USE IN MAGNETIC RECORDING DISC MEDIA

[75] Inventor: Chandler M. Baldwin, Santa Clara, Calif.

[73] Assignee: Memorex Corporation, Santa Clara, Calif.

[21] Appl. No.: 254,935

[22] Filed: Apr. 16, 1981

[51] Int. Cl.[3] .............................................. H01F 10/02

[52] U.S. Cl. .................................... 427/128; 428/329; 428/336; 428/694; 428/900

[58] Field of Search ................................ 427/127-132, 427/48; 252/62.54; 428/900, 336, 694, 329

[56] References Cited

U.S. PATENT DOCUMENTS 3,214,379 10/1965 Lindquist .......................... 252/62.5
3,622,386 11/1971 Larsen ................................ 117/235
3,843,404 10/1974 Haefele et al. ...................... 117/235

*Primary Examiner*—Bernard D. Pianalto

*Attorney, Agent, or Firm*—John J. McCormack; Nathan Cass; David W. Heid

[57] ABSTRACT

A magnetic recording medium and method of producing the same are taught. The medium comprises magnetic particles and alumina particles dispersed in a binder as a unitary coating whereby each of the alumina particles disposed in the binder is substantially equal to the thickness of the medium wherein the alumina particles are produced by first forming an aluminum hydrate from alumina hydrate gel according to the following equation:

$$Al_2O_3.nH_2O \rightarrow Al_2O_3.3H_2O + (n-3)H_2O$$

and heating the aluminum hydrate above approximately 800° C. to form alumina of substantially spherical configuration according to the following equation:

$$Al_2O_3.3H_2O \rightarrow Al_2O_3 + 3H_2O$$

7 Claims, No Drawings

PRECIPITATED ALUMINA FOR USE IN MAGNETIC RECORDING DISC MEDIA

BACKGROUND OF THE INVENTION

Magnetic recording media are well known in the arts, and include tapes, discs, drums, and other forms of tablet or continuous loop configurations. These recording media generally comprise a magnetic coating material deposited upon a permanent substrate. The magnetic coating material coating in turn consists of magnetic particles such as ferromagnetic particles comprised of, for example, iron oxide, disposed in a binder, such as an epoxy resin. Often, the binder systems are complex and the ferromagnetic materials may include other ferromagnetic materials in addition to the iron oxide. These coating compositions are disposed upon a permanent substrate by a number of means, such as by dipping or spincoating or spraying and are cured or otherwise hardened to form a permanent part of the structure.

These various magnetic recording media are, of course, utilized in conjunction with magnetic recording heads or transducers to produce the desired reading, read-write, or write properties. Presently, the thickness of a typical media film is on the order of 1 to 2 μm. However, as current technology trends continue, thinner and thinner magnetic recording media are evolving. Within the next few years, it is anticipated that media thicknesses on the order of 0.5 μm will be required. These thinner coatings will be capable of higher density recording with the recording heads being brought closer and closer to physical contact with the recording media. Very often, as in the case of magnetic discs, this results in "crashing" of the head onto the surface of the disc. Not only does this cause wear upon the disc and head surfaces, but the debris caused by such a crash often adheres to the head and affects its aerodynamic properties. If the coating is physically displaced at a point where the head contacts the recording media, the information stored therein may be permanently destroyed.

The prior art, for example, U.S. Pat. No. 3,843,404 and U.S. Pat. No. 3,622,386 recognize the advantage of producing a magnetic recording layer having a high abrasion resistance by incorporating hard, non-magnetic particles within the magnetic binder layer. Ideally, the prior art has taught the use of hard materials such as aluminum oxide (alumina) in controlled quantities and sizes to substantially increase the abrasion resistance and durability of a magnetic coating. Although the prior art further has recognized the current trend to provide for thinner and thinner magnetic recording layers, the prior art has failed, to date, to controllably produce alumina particles of the required small dimension having, ideally, substantially spherical cross-sectional geometries.

The prior art has recognized the advantage of using alumina particles that are substantially equal to the binder media thickness. The bulk of the alumina particles incorporated into the media has been obtained, generally, from ball-mill debris created during the mixing of the binder solution. To this is added additional alumina which has been subjected to ball-milling. However, the size and shape of these particles can be extremely irregular and oftentimes a large alumina particle will be knocked out of the binder during disc burnishing operations, resulting in a void on the disc surface.

As media thickness decreases from the present day approximately 1 to 2 μm thicknesses to the anticipated approximately 0.5 μm thicknesses, small alumina particles together with tighter particle distributions will also be required. Alumina obtained as a ball-milled debris product cannot meet the submicron size and distribution tolerances. Additionally, the quality of supplemental alumina currently used is too large with much too an uneven size distribution to meet these stringent media thickness requirements.

It is thus an object of the present invention to produce a magnetic recording medium having alumina particles of a substantially spherical geometry which are of a size and particle distribution to avoid those problems experienced by the prior art.

It is a further object of the present invention to provide magnetic recording medium substantially less than 1 μm in thickness having, dispersed therein alumina particles substantially no larger than the media thickness and of the size distribution specifically adaptable for use therein.

SUMMARY OF THE INVENTION

As in the prior art discussed above, the present invention consists of a magnetic recording medium comprising magnetic particles and alumina particles dispersed in a binder as a unitary coating upon a non-magnetic substrate. Each of the alumina particles disposed in the binder are substantially equal to the thickness of the medium. Unlike the prior art, however, the alumina particles are produced by first forming an aluminum hydrate from an alumina hydrate gel according to the following equation:

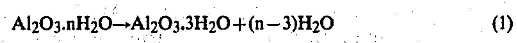

$$Al_2O_3.nH_2O \rightarrow Al_2O_3.3H_2O + (n-3)H_2O \quad (1)$$

wherein $n > 3$

Suitable aluminum hydrate powders are commercially available from Alcoa, Inc., sold under the trademark HYDRAL. It is noted, however, that the reaction kinetics of equation (1) is taught by N. Dezelic, H. Bilinski and R. H. H. Wolf in "Precipitation and Hydrolysis of Metallic Ions," J. Inorg. Nucl. Chem., 33 (3) 791–798 (1971).

The alumina gels ($Al_2O_3.nH_2O$) are synthetically produced from aluminum salts such as aluminum sulfate ($Al_2(SO_4)_3$) and aluminum nitrate ($Al(NO_3)_3$). The gel is produced by combining the aluminum salt with an appropriate alkali salt for hydrated ammonium salt in an autoclave at relatively low temperatures. The resultant gel is highly viscous and super hydrated with a pH generally in the neighborhood of 8–9. Alumina gels are available commercially from both Atomergic Chemicals and Fisher Chemicals.

Various techniques are well known to precipitate aluminum hydrate platelets from the alumina gel (equation 1). The precipitation reaction can be performed at moderate temperatures (e.g., 40° to 80° C.) in a $CO_2$-saturated atmosphere. For a one liter solution, the time of reaction can be as long as two days to achieve the properly precipitated particle size and distribution, i.e. in the range of 0.5 to 1.0 μm.

The aluminum hydrate platelets formed by this reaction are heated to form alumina of substantially spherical configuration according to the following equation:

$$Al_2O_3.3H_2O \rightarrow Al_2O_3 + 3H_2O \quad (2)$$

It is the primary goal of the present invention to produce alumina particles for use in magnetic recording medium having a diameter of less than 1 $\mu$m. A process for producing small spherical alumina particles is known as the Bayerite Process, but such process has never been used for producing such particles for magnetic recording medium. Briefly, this process precipitates an aluminum hydrate from an alumina hydrate gel whereupon subsequent high temperature dehydration can produce $Al_2O_3$, of very uniform particle size, shape and distribution. As stated previously, the precipitation reaction occurs at low temperature (e.g., approximately 40°–80° C.) whereupon $Al_2O_3.3H_2O$ is in the form of platelets. The size of the platelets is determined by the precipitation kinetics which is a function of the water content of the gel as well as the time and temperature of reaction.

Once the platelet size has been determined, they may be dehydrated at temperatures above 260° C. into any of a number of $Al_2O_3$ phases via equation (2) presented above. Above 260° C. the precipitated $Al_2O_3.3H_2O$ platelets lose their water groups and are irreversibly transformed to any of a number of lower-order alumina phases. His reaction occurs spontaneously above 260° C. producing $Al_2O_3$ phases which are generally soft and thermodynamically metastable. Above about 700° C., $\theta$ $Al_2O_3$ is transformed from this accumulation of unstable and metastable $Al_2O_3$ phases. Above 800° C., all of the reaction product is in the form of $\theta$ $Al_2O_3$, which is useful in practicing the present invention.

Although $\theta$ $Al_2O_3$ can be used in practicing the present invention due to its relative hardness, the jagged shape of the particles lead to the conclusion that such particles are not ideal and, in fact, such particles may be not be condusive for disc media usage. At 1100° C., the $\theta$ $Al_2O_3$ is converted to $\alpha$ $Al_2O_3$ during an irreversible reaction forming very hard spherical particles ideally suited for carrying out the present invention.

The initial precipitation reaction defines the ultimate particle size and distribution, whereas the dehydration reaction defines the alumina crystal phase and particle shape. Alumina precipitates have been formed having average particle sizes ranging from 0.03 to 1.0 $\mu$m. It has been found that the particle size distribution can be controlled to a ±40%. For example, 0.5 $\mu$m $Al_2O_3$ average particle size would have no particles greater than 0.7 $\mu$m or less than 0.3 $\mu$m. If an even tighter particle size distribution is deemed necessary, the reaction product can be filtered through a micropore filter system although this is not necessary in most applications. Due to the fineness of the particles in a, for example, 0.5 $\mu$m recording medium, the media should be formulated by means other than ball-milling.

Certain features and advantages of the invention have been described in detail herein, but it is obvious that many modifications thereof may be made without departing from the spirit and scope of the invention.

What is claimed is:

1. A method of manufacturing a magnetic recording medium comprising magnetic particles and alumina particles dispersed in a binder as a unitary coating upon a non-magnetic substrate wherein each of the alumina particles are disposed in said binder and are substantially equal to the thickness of the medium wherein said alumina particles are produced by first forming an aluminum hydrate from an alumina hydrate gel according to the following equation:

$$Al_2O_3.nH_2O \rightarrow Al_2O_3.3H_2O + (n-3)H_2O$$

wherein $n > 3$ and heating the aluminum hydrate above approximately 800° C. to form alumina according to the following equation:

$$Al_2O_3.3H_2O \rightarrow Al_2O_3 + 3H_2O$$

2. The method of producing a magnetic recording medium of claim 1 wherein the alumina is present in an amount not above approximately 5% by weight of the magnetic and alumina particles.

3. The method of producing a magnetic recording medium of claim 2 wherein the alumina is present in an amount between approximately 3%–5% by weight of the magnetic and alumina particles.

4. The method of making the magnetic recording medium of claim 1 wherein the aluminum hydrate is heated above approximately 1100° C. forming substantially spherical particles of $Al_2O_3$.

5. The method of making the magnetic recording medium of claim 1 wherein the magnetic particles are ferromagnetic particles.

6. The method of making the magnetic recording medium of claim 1 wherein the unitary coating located upon the non-magnetic substrate is approximately 0.5 $\mu$m in thickness.

7. The method of making the magnetic recording medium of claim 5 wherein the alumina particles are approximately 0.3 to 0.7 $\mu$m in diameter.

* * * * *

UNITED STATES PATENT AND TRADEMARK OFFICE

CERTIFICATE OF CORRECTION

PATENT NO. : 4,404,238

DATED : September 13, 1983

INVENTOR(S) : Chandler M. Baldwin

It is certified that error appears in the above-identified patent and that said Letters Patent is hereby corrected as shown below:

Col. 2, line 51, change "for" to --or--.

Signed and Sealed this

*Fifteenth* Day of *November 1983*

[SEAL]

*Attest:*

GERALD J. MOSSINGHOFF

*Attesting Officer* *Commissioner of Patents and Trademarks*